June 7, 1932.  W. N. GILBERT  1,862,012
WEIGHING SCALE
Filed April 8, 1929   3 Sheets-Sheet 3
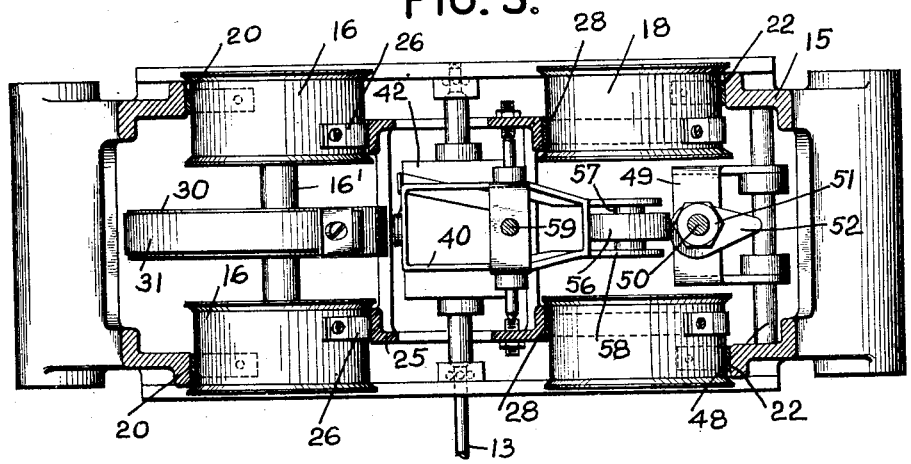
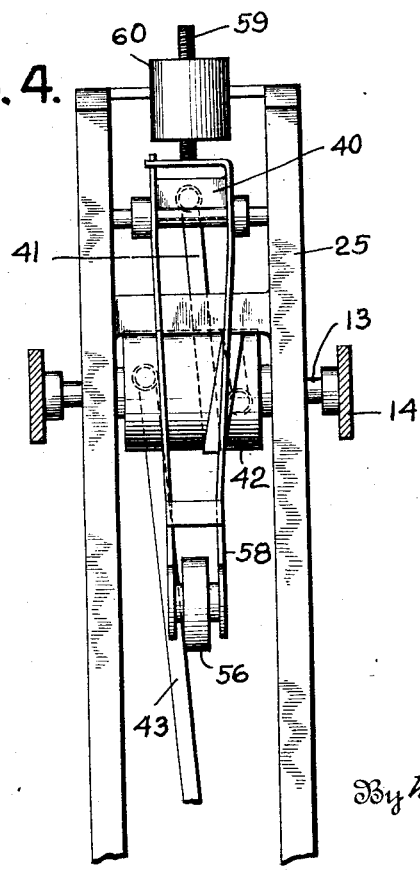
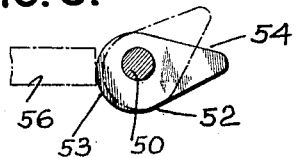

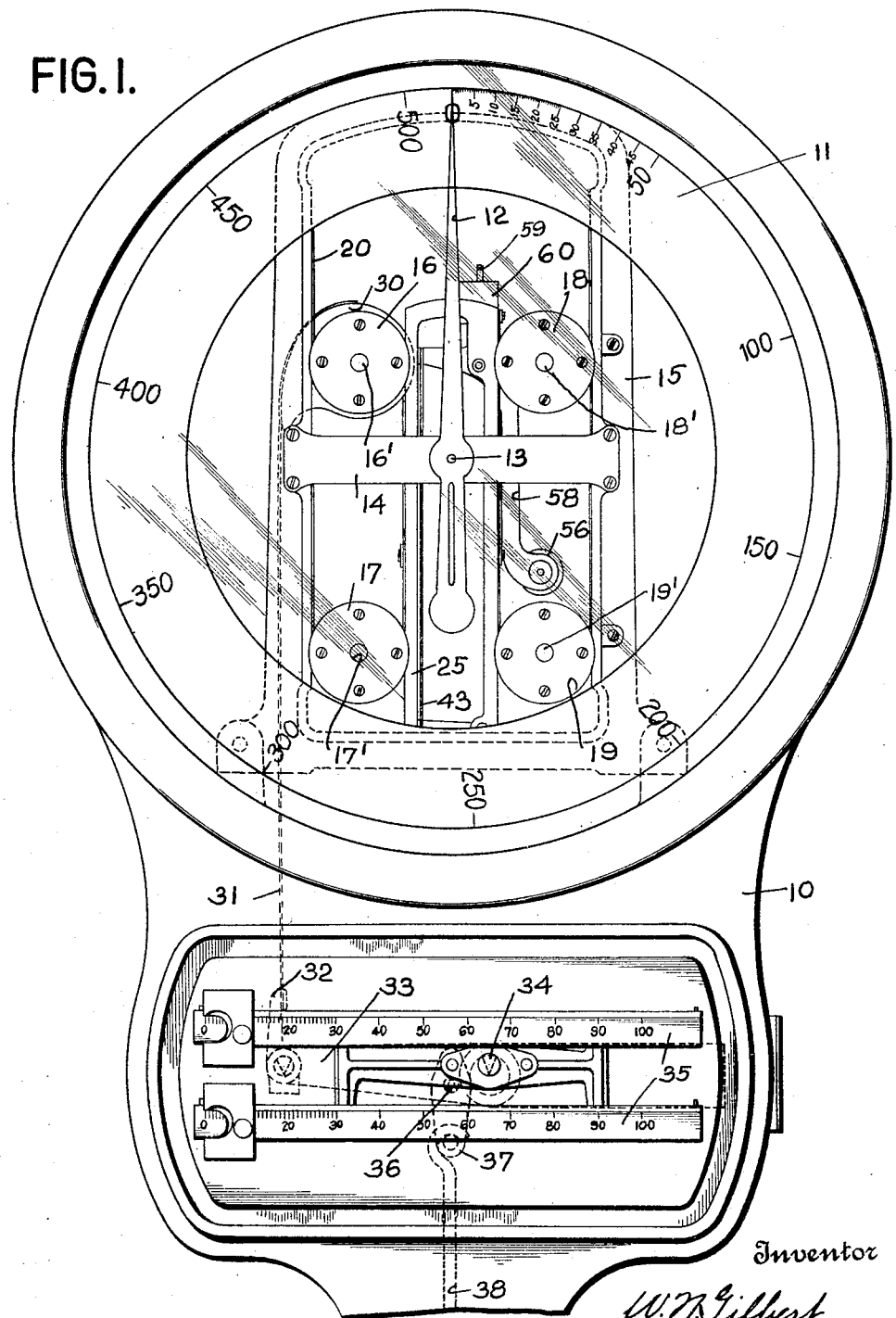

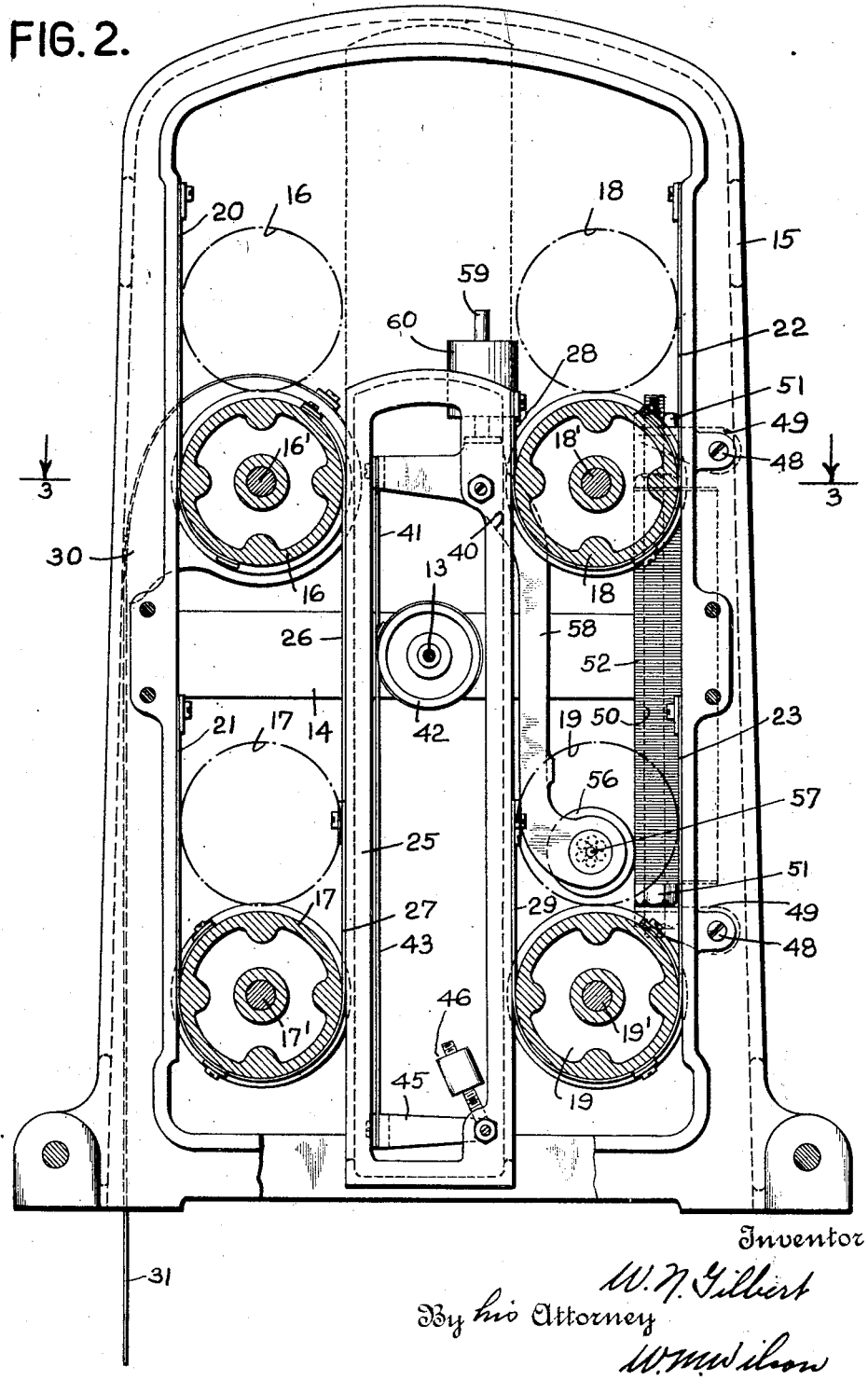

Patented June 7, 1932

1,862,012

UNITED STATES PATENT OFFICE

WILLIAM N. GILBERT, OF HUDSON HEIGHTS, NEW JERSEY, ASSIGNOR TO DAYTON SCALE COMPANY, OF DAYTON, OHIO, A CORPORATION OF NEW JERSEY

WEIGHING SCALE

Application filed April 8, 1929. Serial No. 353,349.

This invention relates to springless weighing scales.

The object is to provide a novel counterbalancing system which will provide the maximum weighing capacity for a given movement of the scale beam.

Further, the object is to provide novel means for multiplying the movement of an indicator from a counter-balancing system.

Still further, the object is to provide a counterbalancing system consisting of a plurality of weighted rollers interconnected for movement along a fixed frame.

Another object is to provide novel sealing means for the scale.

Still another object is to provide a novel connection between the counterbalancing system and the indicator for driving the latter.

Further and other objects and advantages will be hereinafter set forth in the accompanying specification and claims, and shown in the drawings, which by way of illustration show what is now considered to be the preferred embodiment of the invention.

In the drawings:

Fig. 1 is a front view of the upper portion of the scale;

Fig. 2 is an enlarged detail view of the counterbalancing mechanism;

Fig. 3 is a section on line 3—3 of Fig. 2;

Fig. 4 is a view taken from the right side of Fig. 3, and;

Fig. 5 is a detail of the adjustment for a sealing element.

In detail, the scale comprises a housing 10 provided with a dial chart 11 coacting with a pointer 12. The latter is carried by a shaft 13 journalled in cross pieces 14 extending across a rectangular, stationary frame 15. This frame supports the counterbalancing system (Figs. 2 and 3) consisting of eight counterweights, in the form of rollers, for counterbalancing the weight of a load on the platform (not shown). The rollers occur in pairs fixed to opposite ends of horizontal shafts. Rollers 16 are thus fixed to a shaft 16', rollers 17 are fixed to shaft 17', rollers 18 to shaft 18', and rollers 19 to shaft 19'. Each pair of rollers is suspended from the frame 15 by tapes. Tapes 20, 21, 22, and 23 are thus respectively attached to rollers 16, 17, 18, and 19. When a load is applied, all the rollers move up and wind up the aforesaid tapes. Between rollers 16 and 17 on one side of the frame 15 and rollers 18 and 19 on the other side of the frame is a movable oblong frame 25 which constrains the rollers to movement in a vertical direction only. The rollers are flanged at both sides, the inner flanges coacting with the movable frame 25 and the outer flanges with the fixed frame 15 whereby axial movement of the rollers is also prevented. Each of the rollers has a tape connecting it with the movable frame 25, tapes 26, 27, 28, and 29 thus respectively connecting rollers 16, 17, 18, and 19 to the frame. Rollers 16 may be termed the actuating rollers inasmuch as it is the movement of these rollers along tape 20 which through tape 26 lifts frame 25 which in turn lifts through tapes 27, 28, and 29, rollers 17, 18, and 19, respectively.

Shaft 16' has a cam 30 fixed thereto to which is attached the upper end of a tape 31. The lower end of tape 31 is fastened to a link 32 having a pivotal connection with a lever 33 pivoted to the scale frame by a knife edge 34. The usual tare beams 35 are rigidly attached to the lever 33. The latter is provided with a second knife edge engaged by a link 37 having a pivoted connection with the draft rod 38 connected to the base levers (not shown). Thus when a load is applied to the scale the base levers cause downward movement of the draft rod which rocks lever 33 counterclockwise and pulls down on tape 31. The latter through its connection with cam 30 rotates the shaft 16' counterclockwise. The rollers 16 thereupon wind up tape 20 and through tapes 26 lift frame 25 and rotate rolls 17, 18, and 19 to wind up their respective tapes attached to frame 15.

The frame 25 in rising actuates the indicator shaft 13 in the following manner. Pivoted between the sides of frame 25 is a bail 40, the horizontal arm of which has the upper end of a tape 41 attached thereto. The tape is wound once about the periphery of a drum 42 and then fixed thereto. A second tape 43 is fixed to said drum at a point spaced from the tape 41. The lower end of tape 43 is fixed to an arm 45 pivoted to the frame 25 and biased downwardly by a weight 46 adjustably threaded on an extension of said arm. The effect of arm 45 is to keep tapes 41 and 43 taut and prevent overthrow of the drum 42 upon movement of the frame 25 upwardly and upon the downward movement of said frame to cause drum 42 to wind up tape 41. Drum 42 is rigid with shaft 13 and consequently upon its rotation through tapes 41 and 43 causes rotation of the pointer 12 to indicate the weight on dial 11.

In order to seal out the scale so that equal increments of weight cause equal movements of the indicator throughout its travel the frame 15 has rigidly fastened thereto a pair of rods 48 (see Fig. 3). Rigidly fixed to the rods 48 are plates 49 between which a threaded rod 50 is carried and held against rotation by lock nuts 51. Rotatably mounted on the rod 50 are a plurality of thin sealing plates 52 having a rounded cam portion 53 at the left (as viewed in Fig. 5) and a handle portion 54 at the right. The cam portion is designed to engage a roller 56 mounted on ball bearings on a stud 57 carried between the sides of vertical depending arms 58 comprising an integral part of bail 40. A threaded rod 59 fixed to the bail and upwardly extending therefrom adjustably carries a weight 60 which is adjusted to cause roller 56 to lightly contact the cam portions 53 of sealing plates 52. Any one of the plates 52 may take either the position shown in full lines in Fig. 5 or the one shown in dotted lines. In the full line position, a plate 52 holds the roller 56 further to the left than in the dotted line position. The position of the roller 56 is a factor in determining the position of the roller 42 and the indicator 12 rigid therewith. Thus if the roller is moved to the right, bail 40 rocks counterclockwise, loosens up on tape 41 and permits arm 45 to draw down on tape 43 rotating drum 42 counterclockwise and moving the indicator 12 backwards. Obviously then, if the indicator at a particular point in its travel would ordinarily be moved too far by a certain increment of weight, the plates 52 engaging the roller 56 at said point should be moved to dotted line position thereby retracting the indicator.

The plates can be adjusted to give the desired motion to the indicator at all points of its travel. After they have been so adjusted they are clamped in position on rod 52 by tightening nuts 51.

The operation of the scale is as follows: When a load is placed on the platform (not shown) the rod 38 is pulled downwardly rocking the lever 33 counterclockwise and pulling down on tape 31. The latter rocks the shaft 16' on which rollers 16 are fixed and through the tapes 26 connected to these rollers lifts frame 25 which in turn lifts rollers 17, 18, and 19. The extreme upper position of the rollers and frame 25 is shown in dotted lines in Fig. 2. The frame 25 carries with it the bail 40 which through tapes 41 and 43 rotates the drum 42 and shaft 13 to which indicator 12 is fixed.

The purpose of cam 30 is to vary the moment arm of the applied load whereby movement of the counterbalancing mechanism is adapted to vary in accordance with the load. If the moment arm of the applied load were constant, the weight and moment arm of the rollers and frame 25 being fixed, the application of any load would overbalance the rollers and frame to the limit of their movement. This can easily be understood by comparing the moment arm of the load to one side of a lever and the moment arm of the counterbalances to the other arm of the lever. If the moments of a lever are equal, an additional load on one arm will completely overbalance the other arm. By decreasing one of the moment arms as the load thereon is increased, the moment equal to the product of said load by said arm remains the same. The decreasing moment arm in the present construction is obtained by the use of eccentric 30.

The invention permits the use of four counterbalancing weights including a frame providing an evenly distributed counterbalancing system. The equal distribution of the counterbalances on both sides of frame 25 neutralizes any tendency to errors due to placing the scale out of level.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention therefore to be limited only as indicated by the scope of the following claims:

1. In a scale, a stationary frame, a counterbalancing system movable along said frame, a movable frame guided for movement through free, slidable engagement with the counterbalancing system and actuated by said counterbalancing system, an indicator driven by said movable frame, and means for actuating said counterbalancing system.

2. In a scale, a stationary frame, load resistant members comprising rollers guided for rolling movement along said frame, a movable frame guided for movement and actuated by said rollers, an indicator element mounted on said stationary frame and actuatable by said movable frame, and means for actuating said rollers.

3. In a scale, a stationary frame, a counterbalancing system movable along said frame, a movable frame guided for movement and actuated by said counterbalancing system, an indicator driven by said movable frame, means carried by said stationary frame for adjusting the effect of said movable frame on said indicator, and means for actuating said counterbalancing system.

4. In a scale, a stationary frame, a counterbalancing system supported by said frame, means for actuating said system, a movable frame actuated by said system, an indicator, connections from said movable frame to said indicator for driving the latter, sealing means carried by said stationary frame, and means carried by said connections exterior to said movable frame for engaging said sealing means to vary the movement of the indicator.

5. In a scale, a stationary frame, a counterbalancing system supported thereby, an indicator mounted on said frame, means actuated by said system for driving said indicator, and a cam adjustable as to contour carried by said frame and engaging said means for controlling the effect of said means on said indicator.

6. In a scale, a stationary frame, a counterbalancing system supported thereby, an indicator mounted on said frame, means actuated by said system for driving said indicator, and a plurality of individually adjustable cam elements carried by said frame for engaging said means and controlling the effect of said means on said indicator.

7. In a scale, a stationary frame, a counterbalancing system supported thereby, a movable frame guided for movement in a vertical direction by free, slidable engagement with said counterbalancing system and actuated thereby, an indicator, a drum carried by said stationary frame for driving said indicator, and a tape connecting said drum to said movable frame whereby the indicator drum and indicator are actuated upon movement of said movable frame.

8. In a scale such as described in claim 7, and means for holding said tape taut at all times.

9. In a scale, a scale beam, a stationary frame, a plurality of counterbalancing rollers guided for movement along said frame, means for driving one of said rollers from said beam, and means actuated by said latter roller for actuating the remaining rollers.

10. In a scale, a stationary frame, a plurality of counterbalancing rollers, tapes for suspending said rollers from said frame, a cam carried by one of said rollers, a scale beam, a connection from the scale beam to the cam for driving the roller carrying said cam, and means actuated from said cam-carrying roller for actuating the remaining rollers.

11. In a scale, a stationary frame, a plurality of vertically spaced counterbalancing rollers, tapes attached to said frame for suspending said rollers therefrom, an indicator element carried by said frame, and means connecting said rollers to each other and to said indicator for actuating the latter.

12. In a scale, a stationary frame, counterbalancing rollers, tapes attached to said frame, each tape being connected to a roller for suspending it from said frame, an indicator element, a movable frame for actuating said element, tapes attached to said movable frame, each tape being attached to a roller, and means for actuating one of said rollers to cause actuation of the movable frame, said frame thereby serving to actuate the remaining rollers through the tapes attached thereto.

13. In a scale such as described in claim 12, said rollers engaging said movable frame to guide its movement.

14. In a scale such as described in claim 12, said rollers engaging said frame at opposite sides thereof to guide it for vertical movement.

15. In a scale such as described in claim 12, said movable frame having a tape connected thereto and to said indicator element for actuating the latter.

16. In a scale such as described in claim 12, said movable frame having means for constantly keeping said indicator-driving tape taut.

17. In a scale such as described in claim 12, said rollers having flanges engaging the movable and stationary frames for guiding the rollers along said frames.

18. A sealing device for scales comprising a cam and a handle portion for rotating said cam, and load indicating mechanism including an element freely movable along said cam.

19. A sealing device for scales comprising a plurality of elements formed with cam portions, a rod on which said elements are rotatably mounted one above the other, and clamping means on said rod for clamping the elements against movement on the rod.

20. In a scale, a load resistant element, guides connected to and engaging and constraining opposite sides of said element, and load-operated means for actuating said element to move it along said guides.

21. In a scale, a plurality of load resistant elements, one above the other, guides connected to and engaging and constraining opposite sides of said element and along which said element is adapted to roll, and load-operated means for actuating said element to roll it along said guides.

22. In a scale, a load resistant rolling element, guides movable relative to each other for engaging and constraining opposite sides of said element, a connection between each guide and said element, and load-actuated means for moving said guides relatively to roll said element along the guides.

23. In a scale, a load resistant rolling element, guides engaging and constraining opposite sides of said element, one of the guides being movable and the other relatively fixed, tapes connecting the element to each guide, and load-actuated means for moving said movable guide to roll the element along the guides whereby to unwind from the element the tape connecting the said movable guide and element and to wind up the other tape on the element.

24. In a scale, a plurality of load resistant elements, a guide between and in engagement with said elements, load-actuated means for rolling said resistant elements along the opposite sides of said guide, and an indicator for indicating the movement of the resistant element.

25. In a scale, load resisting means, a movable member along which said means is adapted to roll, and load-actuated means movable relative to the member for moving said member to effect rolling of the resisting means along said member.

26. In a scale, an indicator, a shaft on which the indicator is mounted, a member rigid on said shaft, a tape device connected to said member and extending and terminating in opposite directions therefrom, a frame, elements mounted on said frame to be normally freely movable relatively thereto, the elements being on opposite sides of said member and connected to the opposite ends of said tape device, and load-actuated means for operating the frame to actuate the indicator through said tape and elements.

27. In a scale, load-operated means, an indicator, connections between the latter and said means including a tape and a member connected to the tape, sealing means, said member freely, movably, engaging said sealing means throughout the entire range of movement of the indicator to adjust the movement of the latter.

28. In a scale, load resistant means, indicating means controlled by the resistant means, and sealing means comprising individually adjustable elements having cam surfaces cooperating with the indicating means to adjust the movement of the indicating means throughout its entire travel.

29. In a scale, a frame, a plurality of load resistant members having a rolling engagement with said frame, the center of gravity of said members being at the axis of rotation of said members, indicator mechanism controlled by said members, and common actuating means for said members to roll them along the frame, said actuating means including a variable moment arm device for varying the counterbalance action of the rollers in accordance with the magnitude of the load.

30. In a scale, a stationary frame, a vertically movable member, rollers between the frame and said member and effectively engaged with the frame and member, means positively connecting the rollers to the frame and to the member, a load responsive device, and means connecting the device to the member to move the latter vertically and through the connections of the member to the rollers move the axes of the latter vertically.

In testimony whereof I hereto affix my signature.

WILLIAM N. GILBERT.